United States Patent [19]

Nilsson

[11] 3,829,726

[45] Aug. 13, 1974

[54] ELECTRICALLY DRIVEN BALL OR ROLL SCREW MECHANISM

[75] Inventor: Sven Walter Nilsson, Partille, Sweden

[73] Assignee: SKF Industrial Trading and Development Company B.V., Jutphaas, Netherlands

[22] Filed: Jan. 17, 1973

[21] Appl. No.: 324,442

[30] Foreign Application Priority Data
Jan. 25, 1972  Sweden.................................. 793/72

[52] U.S. Cl..................................... 310/83, 310/52
[51] Int. Cl.......................... H02k 7/06, F16h 25/22
[58] Field of Search............. 310/13, 52, 57, 80, 83, 310/211

[56] References Cited
UNITED STATES PATENTS

| | | | |
|---|---|---|---|
| 2,047,831 | 7/1936 | Lund................................... | 310/211 |
| 3,402,308 | 9/1968 | Henschke............................ | 310/80 |
| 3,660,704 | 5/1972 | Paine et al........................... | 310/80 |
| 3,685,142 | 8/1972 | Deming............................ | 310/211 X |

Primary Examiner—A. D. Pellinen
Attorney, Agent, or Firm—Howson and Howson

[57] ABSTRACT

An electrically driven screw mechanism comprising an elongated rotor member in the form of a spindle having helically shaped grooves and including rotor windings on the spindle between the helically shaped grooves, a plurality of rolling elements engageable in the grooves, a stator member of generally cylindrical shape circumscribing the rotor member including stator windings and pole cores mounted therein, bearing units adjacent opposite axial ends of the stator member including a pocket spanning at least two grooves in the rotor member and defining recirculation means of an endless path for a plurality of rolling elements.

10 Claims, 4 Drawing Figures

ELECTRICALLY DRIVEN BALL OR ROLL SCREW MECHANISM

The present invention relates to an electrically driven ball or roller screw mechanism comprising a spindle provided with helically shaped grooves and a nut with corresponding inner helically shaped grooves. The nut is provided with re-circulation members for rolling bodies situated in the grooves.

In known devices in which a rotary motion is converted into a linear motion the rotating motion is performed by an electric motor which either directly or via a transmission device is connected to a spindle or a nut belonging to a ball or roller screw mechanism. The electric motor requires a relatively large space and makes the application of the linear displacement device more difficult.

The purpose with the present invention is to obtain a very compact device in which the electric motor is an integrated part of a ball or roller screw mechanism. In accordance with the invention this problem is solved by shaping the nut as a stator and the spindle as a rotor to an electric motor.

The invention is exemplified in the accompanying drawings in one embodiment.

Figure 1:
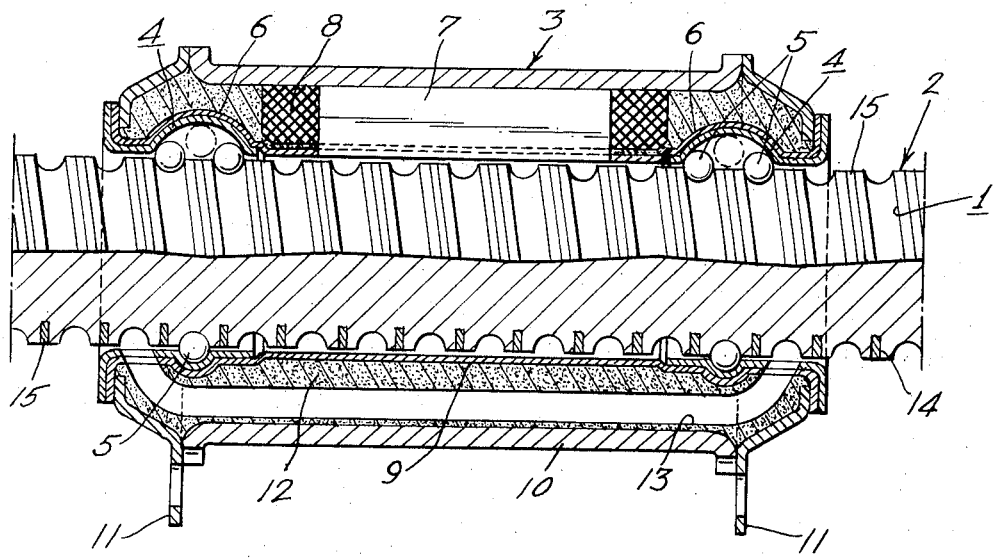
FIG. 1 shows a longitudinal section along the line I — I in FIG. 2.
Figure 2:
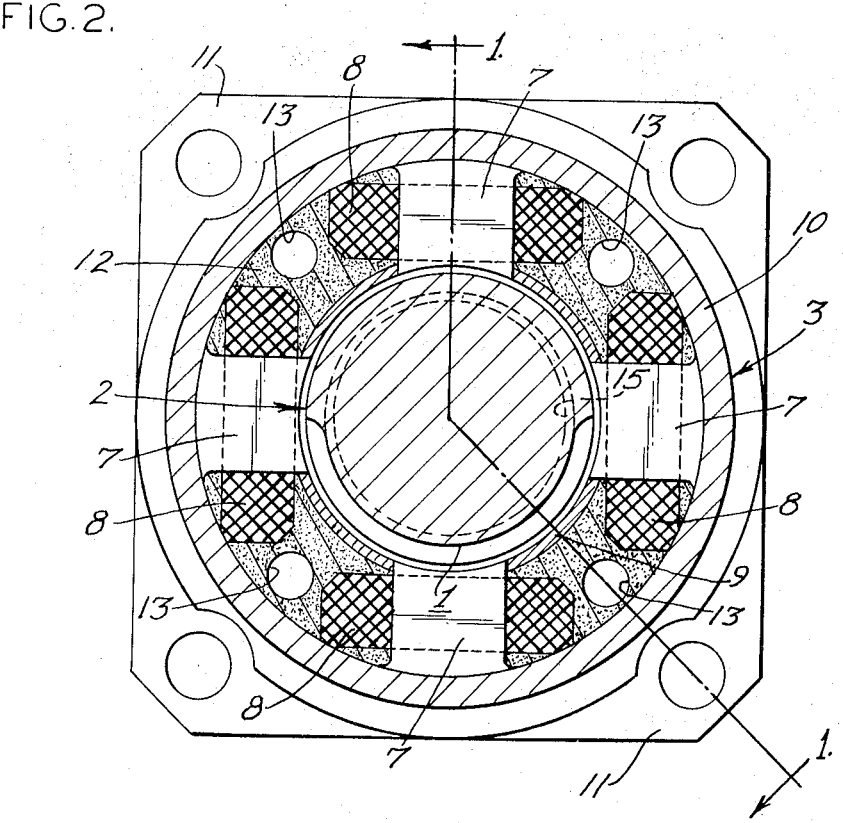
FIG. 2 shows on a larger scale a cross section through the mechanism in accordance with FIG. 1.

The ball screw mechanism comprises a spindle 2 provided with helically shaped grooves 1 by which balls cooperate with a nut 3. This is adjacent to its end sides provided with a bearing unit each consisting of a number of rolling bodies 5 which by means of the re-circulation members 6 are re-circulated so that an endless ball path is obtained.

According to the invention the nut 3 and the spindle 2 are shaped as a stator and a rotor, respectively and therefore the nut is provided with a number of pole cores 7 provided with a winding 8 each, arranged between the bearing units 4 of the nut. Between nut and spindle a sleeve 9 is located, provided with slots through which the pole cores extend towards the spindle. At the ends of the sleeve there is shaped an annular cavity in which said bearing unit is arranged. The outer envelope surface 10 of the nut is at its end sides connected to the inner sleeve 9 and is shaped with ears 11, by means of which the nut could be connected to a stationary member. The space between the sleeve 9 and the mantle 10 is filled with a dielectric plastic material 12 so that the pole cores 7 and their windings 8 are rigidly encased. In the space between the windings 8 there are arranged axial ducts 13, the inlet and outlet openings of which are directed to the spindle 2 and located outside respective bearing unit 4. During the rotation of the spindle the same with its helically shaped grooves will act as a screw pump and thus transporting cooling air through the ducts 13.

The spindle 2 acting as a rotor is between the helically shaped groove 1 provided with at least one further groove 14, in the shown embodiment with rectangular cross section, into which one or more rotor windings 15 are fitted. This or these could consist of one or more wires insulated from each other. It could also consist of a winding of aluminum or copper moulded in the groove 14. If the spindle is shaped as a short-circuit rotor it could be suitable to provide the spindle with axial, parallel bores close to the helically shaped grooves 1 and the grooves 14, respectively, in which bores insulated copper wires or rods are provided, which at the ends of the spindle are connected to each other by means of short-circuit rings.

The short-circuit could also be obtained by placing the axial bores as close as possible to the groove 14, so that the same via openings communicate with each other and that the rotor winding 15 via said openings is short-circuited with the wires or the rods in the bores.

Figure 3:
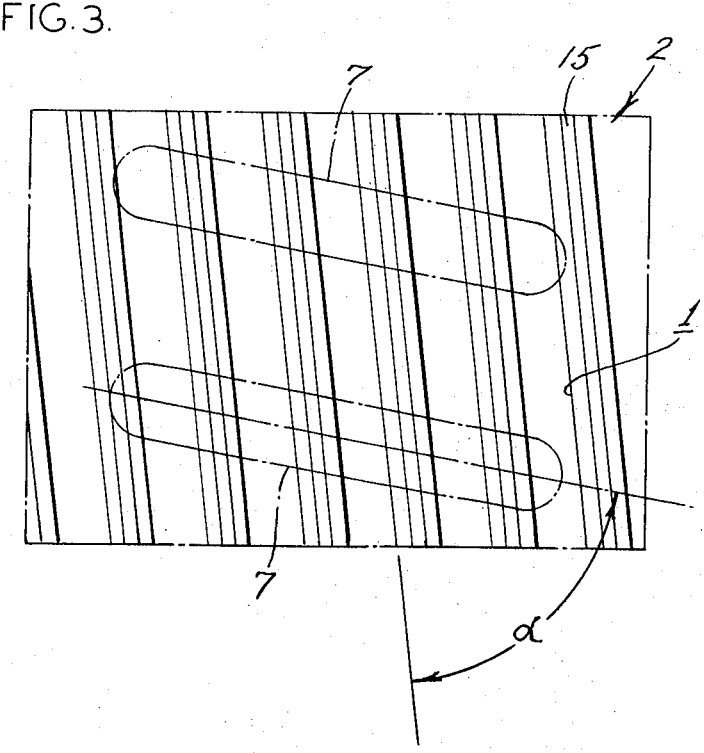
FIG. 3 shows a part of the envelope surface of the spindle in extended state and the location of the pole cores relative to the helically shaped grooves of the spindle.

As shown in FIG. 3 the pole cores 7 are arranged at acute angle $\alpha$ in relationship to the screw pitch of the ball grooves 1.

The stator shown could suitably have four-polar three-phase winding and when connected to a three-phase circuit the rotor rotates synchronously with the alternating current. If the three-phase current is supplied from a source of current, the frequency of which could be varied, the speed of the rotor and thus the axial motion of the spindle could exactly be controlled by regulating the frequency. If it is desired to fix the spindle in a certain position, it is only necessary to reduce the frequency at the source of current to zero and to maintain the excitation in the stator so that no rotating magnetic field is obtained.

The bearing units at each side of the stator of the nut, i.e., the pole cores 7 and the windings 8 could be wholly independent of each other with their own re-circulation members, or it is also possible that one of the bearing units via a common re-circulation member is connected with the bearing unit arranged at the opposite end. Someone of the ducts 13 could possibly be used as re-circulation member and is in such a case shaped so that its inlet and outlet openings debouch in a bearing unit 4 each.

Figure 4:
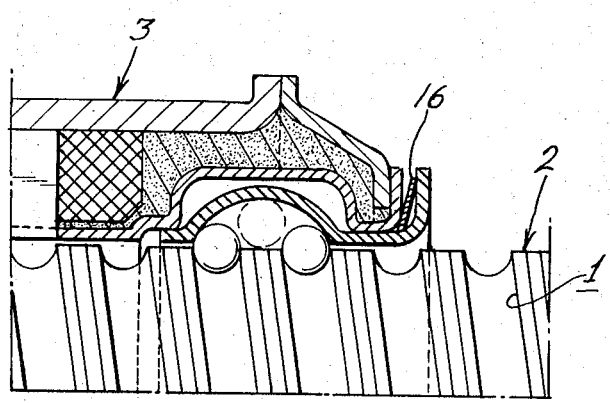
FIG. 4 shows a section through an alternative embodiment of one bearing unit of the ball screw mechanism.

As shown in FIG. 4 one of the bearing units 4 could axially be somewhat movable and pre-stressed by means of spring washer 16 in relationship to the other bearing unit.

The invention is not limited to the above described and to the embodiment shown in the drawings, but a number of modifications are conceivable within the scope of the claims. Thus it is possible to shape the stator 7,8 and the rotor 2 in another manner known within the field of the electrotechnology.

I claim:

1. An electrically driven screw mechanism comprising an elongated rotor member in the form of a spindle having helically shaped grooves and including rotor windings on said spindle between said helically shaped grooves, a plurality of rolling elements engageable in said grooves, a stator member of generally cylindrical shape circumscribing said rotor member including stator windings and pole cores mounted therein, bearing units adjacent opposite axial ends of said stator (including) member including a pocket spanning at least two grooves in said rotor member and defining recirculation means of an endless path for a plurality of rolling elements.

2. A screw mechanism as claimed in claim 1 wherein said pole cores are axially oriented in said stator member at circumferentially spaced locations and including means defining at least one air duct in said stator member and disposed generally paralled to said pole cores having inlet and outlet openings therein axially outboard of said bearing units.

3. A screw mechanism as claimed in claim 2 including an air duct between each of the adjacent pole cores.

4. A screw mechanism as claimed in claim 1 wherein said stator member includes an elongated sleeve closely circumscribing said rotor member and a mantle spaced radially outwardly of said sleeve, said stator windings and cores mounted in the space between said sleeve and mantle and rigidly encased in a dielective plastic material filling said space.

5. A screw mechanism as claimed in claim 4 wherein said sleeve is formed with at least one pocket adjacent an axial end of said stator member and one of said bearing units is mounted therein and adapted for limited axial movement in said pocket an d including biasing means for prestressing said one bearing unit relative to the other bearing unit.

6. A screw mechanism in accordance with claim 1, characterized in that the pole cores are arranged at acute angle in relationship to the screw pitch of the helically shaped grooves.

7. A screw mechanism in accordance with claim 1, characterized in that the spindle is shaped as a short-circuited rotor.

8. A screw mechanism in accordance with claim 1 characterized in that the rotor winding is arranged in at least one groove located between the helically shaped grooves.

9. A screw mechanism in accordance with claim 1 characterized in that the spindle is shaped as a short-circuited cage armature provided with axial bores arranged close to its peripheral helically shaped grooves intended to receive insulated wires or rods made of a material with good conductivity, said wires or rods at the ends of the spindle being in electrically conducting connection to each other by means of short-circuited rings.

10. A screw mechanism in accordance with claim 1, characterized in that axial bores are arranged in direct connection to the groove (s) for the rotor winding(s) so that communicating openings are shaped between them and that the rotor winding(s) via said openings is short-circuited with wires or rods arranged in the bores.

* * * * *